United States Patent
Mack, II et al.

[19]

[11] Patent Number: 5,991,637
[45] Date of Patent: *Nov. 23, 1999

[54] INTEGRATED PASSIVE AND ACTIVE COMMUNICATIONS SYSTEM

[76] Inventors: Gawins A. Mack, II; R. Eugenia Mack, both of 709 S. Mangonia Cir., West Palm Beach, Fla. 33401

[*] Notice: This patent issued on a continued prosecution application filed under 37 CFR 1.53(d), and is subject to the twenty year patent term provisions of 35 U.S.C. 154(a)(2).

[21] Appl. No.: 08/639,838

[22] Filed: Apr. 19, 1996

[51] Int. Cl.⁶ ........................................... H04Q 7/20
[52] U.S. Cl. ..................... 455/550; 455/90; 455/568; 455/569; 455/575
[58] Field of Search ..................... 455/403, 550, 455/556, 557, 568, 575, 90, 563, 345, 352, 353, 132, 140, 351, 426, 566, 567, 569; 379/430; 381/25, 183, 187; 704/272, 275, 251, 231, 254

[56] References Cited

U.S. PATENT DOCUMENTS

| | | | |
|---|---|---|---|
| 4,481,382 | 11/1984 | Villa-Real | 455/556 |
| 4,591,661 | 5/1986 | Benedetto et al. | 455/568 |
| 4,682,363 | 7/1987 | Goldfarb et al. | 455/90 |
| 4,720,857 | 1/1988 | Burris et al. | 379/430 |
| 4,882,745 | 11/1989 | Silver | 379/61 |
| 4,945,557 | 7/1990 | Kaneuchi et al. | 379/67 |
| 4,949,374 | 8/1990 | Ishii et al. | 455/563 |
| 4,975,949 | 12/1990 | Wimsatt et al. | 379/387 |
| 4,993,061 | 2/1991 | Hsieh | 455/403 |
| 5,042,063 | 8/1991 | Sakanishi et al. | 379/88 |
| 5,113,428 | 5/1992 | Fitzgerald | 379/61 |
| 5,191,602 | 3/1993 | Regen et al. | 379/58 |
| 5,243,640 | 9/1993 | Hadley et al. | 455/426 |
| 5,359,647 | 10/1994 | Regen et al. | 379/56 |
| 5,369,685 | 11/1994 | Kero | 379/67 |
| 5,426,689 | 6/1995 | Griffith et al. | 379/58 |
| 5,526,406 | 6/1996 | Luneau | 455/563 |
| 5,615,410 | 3/1997 | DeMars | 455/90 |
| 5,636,265 | 6/1997 | O'Connell et al. | 455/567 |
| 5,721,775 | 2/1998 | Leifer | 379/430 |
| 5,722,069 | 2/1998 | Donner | 455/566 |

*Primary Examiner*—Dwayne D. Bost
*Assistant Examiner*—Nay Maung
*Attorney, Agent, or Firm*—John C. Smith

[57] ABSTRACT

A combined entertainment and communications system includes a passive communications subsystem such as an AM/FM radio receiver, an active communications subsystem such as a cellular telephone transmitter/receiver or a CB radio transmitter/receiver, and a shared I/O subsystem. The subsystems are integrated into a single portable package and are controlled by a control mechanism capable of automatically or semi-automatically switching control of the shared I/O subsystem between the active and passive communications subsystems. Size and weight of the device are reduced by sharing common input/output (I/O) and control components. Optional voice recognition equipment can be used to control the active or passive communications subsystems. Alternative embodiments provide additional functions such as voice activation, remote monitoring, radio station scanning for preselected audio works, caller ID used in conjunction with voice synthesis, folding headsets, and modular function packaging to easily expand or alter a particular system. Voice recognition can also be used in a passive only version of the system.

22 Claims, 15 Drawing Sheets

INTEGRATED PASSIVE AND ACTIVE COMMUNICATIONS SYSTEM

BACKGROUND OF THE INVENTION

1. Technical Field

The present invention relates to the field of portable electronic devices. In particular, it relates to radio headset receivers which are capable of automatically and/or semi-automatically activating a telephone interface controller such that the passive radio headset can be integrated with active communications devices such as portable telephones, walkie-talkies, intercoms, or monitoring devices.

2. Background Art

Portable passive electronic devices such as an AM/FM radio or a cassette player are well known. Compact entertainment devices have been used by individuals desirous of having the availability of music while engaged in outdoor activities such as walking, jogging, etc. Early portable entertainment devices used a larger main unit with a radio receiver and/or tape player which attached to an individual's belt or clothing. These devices typically have a separate headset which is attached to the main unit via wires.

More recently, self contained headsets such as those typified by the "Walkman" (TM) headsets commercially available from SONY corporation have become popular. These units are lighter in weight than previous units. As a result, a user can comfortably wear this type of headset without the inconvenience of the heavier separately carried units discussed above. In particular, the user does not have to be concerned about accidentally becoming entangled with the headset wires, thereby disconnecting the headset.

Other portable active electronic devices such as cellular telephones, intercoms, walkie-talkie devices, CB radio, etc. are also well known. These devices allow a user the benefit of communicating while traveling or engaging in outdoor activities. These devices have many of the drawbacks of earlier entertainment devices in that they are inconvenient to carry. Further, when a user is engaged in outdoor activities such as jogging, walking, etc., it is inconvenient to use a portable communication device due to the necessity of having to first remove the portable entertainment units headset. Further, the additional weight and nuisance of carrying multiple devices discourages users from taking both types of devices.

While the ability to communicate often provides a user with convenience, it can also provide the user with an added element of security. For example, many individuals jog alone. As a result, they can be targets for assailants, they can become injured due to traffic accidents, or even become injured from the physical activity they are engaged in. The possession of a telephone while engaging in leisure activities such as jogging or while working outdoors can be useful for summoning help, and may be an important factor in the jogger obtaining timely help. Unfortunately, the inconvenience of carrying two separate systems while outdoors typically results in an individual choosing one type of device or another, but not both.

A factor in the overall bulk and inconvenience associated with carrying two types of systems is the redundant nature of many components in each system. For example, both a radio headset and a cellular telephone include speakers and audio circuitry, both may have LCD display panels and the associated driving circuitry, and both may have data entry devices such as keypads.

While addressing the basic desirability of having access to entertainment and communications while outdoors, the prior art has failed to provide an integrated system which allows convenient access to both communications and entertainment in a single device. Further, the prior art has failed to provide for automatic or semi-automatic switching between the two devices, a modular system capable of function substitution, a common control mechanism capable of managing the shared use of individual components of each system, or the automatic interruption of one function by another based on priority.

SUMMARY OF THE INVENTION

The present invention solves the foregoing problems by providing a combined entertainment and communications system which includes a passive communications subsystem such as an AM/FM radio receiver, an active communications subsystem such as a cellular telephone transmitter/receiver or a CB radio transmitter/receiver, a shared I/O subsystem, and a mechanism for switching the I/O between subsystems. The subsystems are integrated into a single portable package and are controlled by a control mechanism capable of automatically or semi-automatically switching control of the shared I/O subsystem between the active and passive communications subsystems. Size, weight, and cost of the device are reduced by sharing common input/output (I/O) and control components. Alternative embodiments provide additional functions such as voice activation, remote monitoring, radio station scanning for preselected audio works, caller ID used in conjunction with voice synthesis, folding headsets, and modular function packaging to easily expand or alter a particular system.

DESCRIPTION OF THE PREFERRED EMBODIMENT

Figure 1:
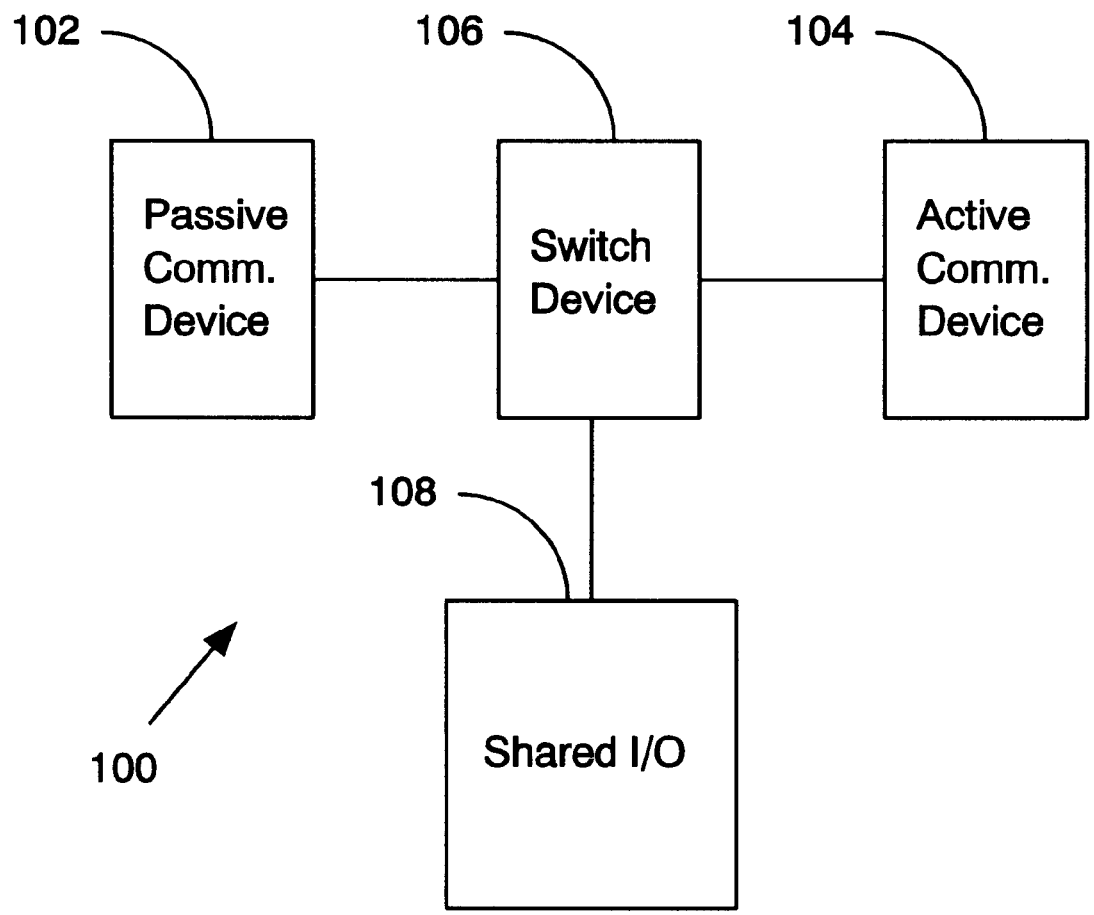
FIG. 1 is a block diagram of a preferred embodiment illustrating the passive subsystem, active subsystem, shared I/O devices and switching device used as the control mechanism.

Referring to FIG. 1, this figure shows a block diagram of the Integrated Passive and Active Communications (hereinafter IPAC) system 100. The shared I/O devices 108, which provide an important advantage in terms of reduced weight and cost, are illustrated by this figure. In normal operation, the passive communications device 102 is connected to the shared I/O devices 108 via switch 106. The passive communications device 102 would typically be an AM/FM radio receiver. AM/FM radio receivers are well known in the art. Those skilled in the art will recognize that alternatives to a standard AM/FM receiver could be used, such as cassette tape players, compact disc players (CDS), police scanners, etc.

Active communications device 104 is envisioned as a conventional cellular phone. However, those skilled in the art will recognize that any suitable telephone technology can be used, such as a wireless telephone with a fixed base station, higher frequency (900 MHZ) telephones which have been recently developed, walkie talkie transmitter/receivers, etc. While any of these known voice technologies may be used, cellular currently provides the advantage of having no restrictions insofar as range from a fixed base station is concerned. Therefore, it allows the user to communicate from any location.

A user would typically use passive communications device 102 while engaging in outdoor activities (or even indoor activities where the device could be conveniently worn). The audio output from passive communications device 102 would be input to speakers 202 (shown in FIG. 2) under control of switch device 106. Speakers 202 are part of the shared I/O 108. In the event a telephone call is received, switch device 106 interrupts audio data from passive communications device 102 and connects the audio output of the active communications device 104 to speakers 202. In the preferred embodiment, the interruption process would be automatic when a call is received. However, the device can be constructed such that the passive audio is not interrupted until manually switched.

Those skilled in the art will recognize that it is also possible to selectively permit interruption via a hardware or software switch. In effect, a "do not disturb" function can be implemented for call interruption. Further, the active communications device 104 (e.g., the telephone) can be activated to receive or not receive calls regardless of whether the passive communications device 102 (e.g., the radio) is activated. An advantage of using the IPAC 100 in this manner is that the user may not wish to use the radio portion of the device on a particular day, but may wish to have a telephone conversation while jogging. By using a telephone which is completely self contained in the headset of the IPAC 100, the user has the convenience of having a hands free conversation.

The active communications device 104 can also be an alternative to a telephone. For example, a "walkie-talkie" type receiver/transmitter can be used as the active communications device 104. This configuration is useful when two or more individuals want to communicate, but are engaging in activities which require their physical separation. For example, if individuals engage in recreational activities such as bicycling, skiing, rock climbing, etc., they will typically be too far apart to engage in conversation. An active communications device 104 which is implemented as a walkie-talkie allows two or more individuals who are separated by a significant distance to have the convenience of conversation. In addition to the type of communication discussed above, IPAC 100 can be very useful when two or more vehicles are traveling together. For example, if at least one IPAC 100 is in each car of a group of cars, then the occupants of any car can communicate for social reasons or to inform the other vehicles if a stop must be made.

Likewise, outdoor workers, each equipped with an IPAC 100, can also use them to communicate with one another. As a result, work may be performed more efficiently because each worker can immediately be reached or can immediately reach others whenever necessary. This is a particularly valuable advantage, whether or not the device is used for recreation or work, in the event that one of the individuals using the IPAC 100 is injured.

Another embodiment uses the IPAC 100 as a baby monitor. A fixed microphone/transmitter unit 700 (shown in FIG. 7) can be placed in a nursery. The microphone/transmitter unit 700 communicates with the walkie/talkie receiver in the active communications device 104. The parent can then engage in activities or chores throughout the home, or go outside the home for yardwork, etc., without worrying about the status of the infant because the parent is constantly monitoring the infants room. When the infant awakes or needs attention, the parent is immediately aware and can take appropriate action.

It is possible to integrate several devices into the active communications device 104. Telephone, walkie-talkie, and monitor circuitry can be incorporated into a single device. A priority interruption protocol can also be implemented to allow one device to interrupt another. For example, the walkie-talkie can be interruptible by the telephone which in turn can be interrupted by the monitor. Likewise, any of these devices can be used in conjunction with a passive communications device 102.

In addition to the speakers 202, the shared I/O also includes the microphone boom 210 (shown in FIG. 2) and may have optional indicator lamps which can inform individuals near the user that the speakers are activated. The antenna 208 and/or 304 (shown in FIGS. 2 and 3, respectively) may also be part of the shared I/O.

Figure 2:
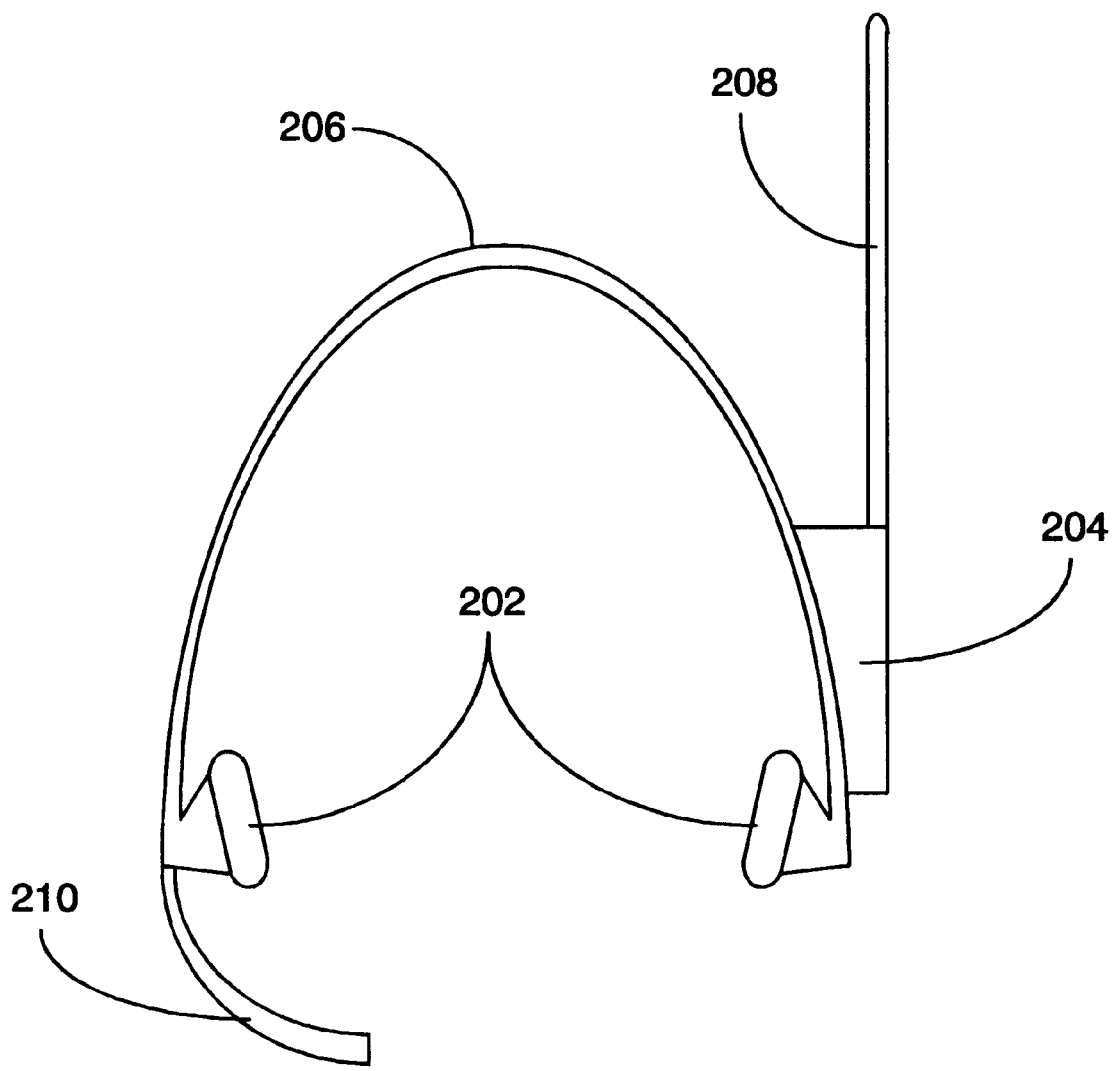
FIG. 2 illustrates a preferred embodiment in which the passive and active communications devices are integrated into the headset. A boom microphone is shown as an integrated part of the headset.

In FIG. 2, a preferred embodiment of the IPAC 100 in which the passive communications device 102 and the active communications device 104 are incorporated into a single communications assembly 204. Communications assembly 204 provides a single integrated structure which houses all of the components required by the passive and active communications devices 102, 104. A single antenna structure 208 is shown attached to communications assembly 204. Those skilled in the art will recognize that while a single antenna may be used for both the passive communications device 102 and the active communications device 104, improved performance will be obtained by using separate antennas, each tuned for a specific frequency, to optimize performance for the particular frequencies used. Of course, it is possible to have separate antenna wires within a single antenna structure 208. This would provide a more compact and visually pleasing outer structure for antenna 208.

Communications assembly 204 is attached to a conventional headset strap 206 which has speakers 202 at each end. In the preferred embodiment, a flexible microphone boom 210 is attached to headset strap 206.

Figure 3:
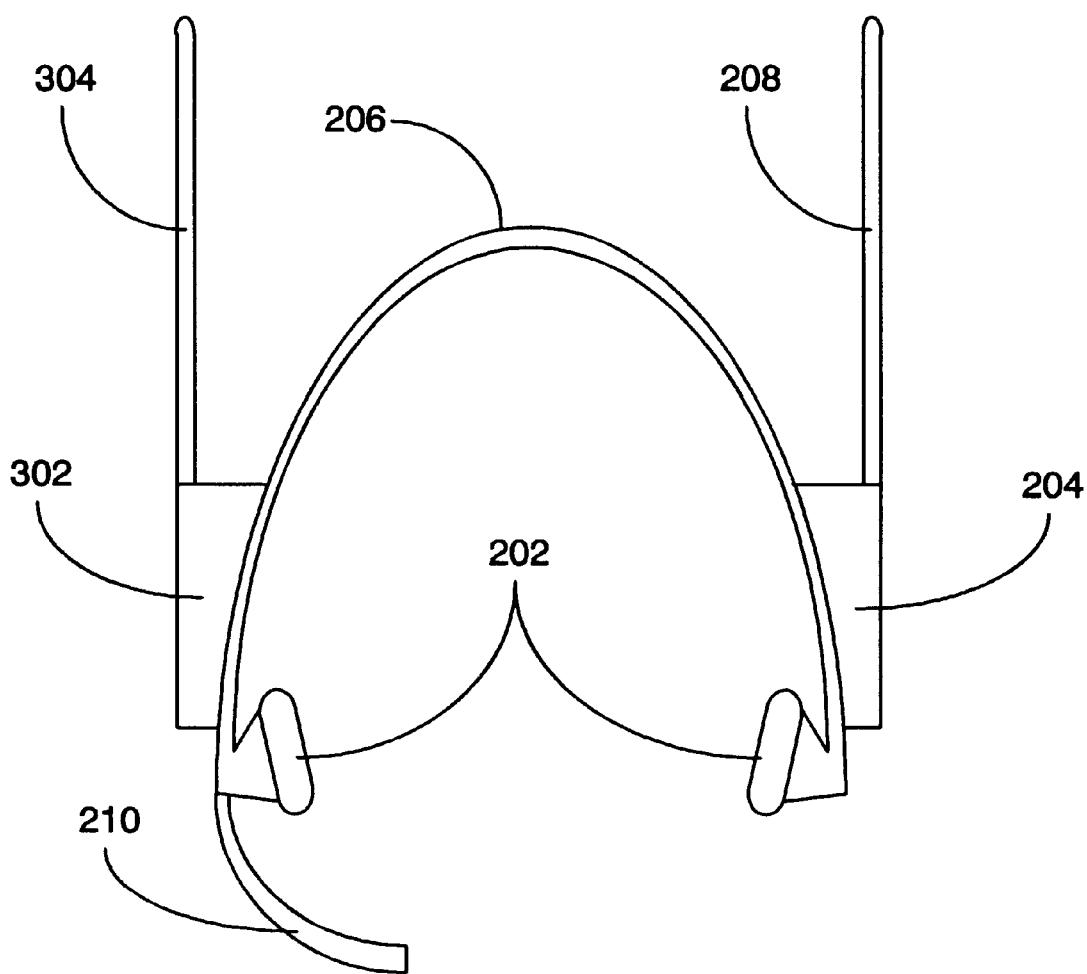
FIG. 3 illustrates an alternative preferred embodiment in which the passive and active communications devices are integrated into opposite sides of the headset. A boom microphone is shown as an integrated part of the headset.

FIG. 3 shows an alternative embodiment of IPAC 100 in which the active communications assembly 302 contains the active communications device 104 and is separate from the passive communications device 102 located in communications assembly 204. By separating the active and passive function circuitry, weight and size can be distributed to both sides of a user's head, resulting in a more comfortable fit.

In addition, the separation provides a convenient method of implementing another embodiment of the invention, in which one particular type of function can be interchanged or substituted for another. For example, if a parent was taking the device out for recreational use, then there would be no need to carry the monitor function. Likewise, the telephone, walkie-talkie, CB radio, or police scanner functions may not be desired on a particular day. Active communications assembly 302 can be designed as a detachable unit which holds a given combination of one or more functions. Active communications assembly 302 can be detached and replaced with another active communications assembly 302 which has an alternative function or functions. For example, the monitor function can be replaced with the telephone function or the walkie-talkie function.

One advantage of this embodiment is the reduction in weight and size which improve the comfort and convenience of the wearer. Further, by designing the system as a modular IPAC 100 system, it can be delivered at lower cost to a user since the user will only purchase the subsystem functions desired. Likewise, the user can grow the system as needs arise if it is modular. For example, a user may not need a monitor function at present, but may need one in the future if a child is conceived. Of course, if the monitor function was not desired, then the user would save the expense of purchasing the fixed microphone/transmitter unit 702. Likewise, features such as walkie-talkie or telephone functions may be incorporated when the user wants to add them. The modularity can be achieved by replacing the entire active communications assembly 302 or by adding a pluggable circuit into the active communications assembly 302. Those skilled in the art will recognize that a modular system allows new technologies and/or functions to be added in the future as they become available.

Figure 4:
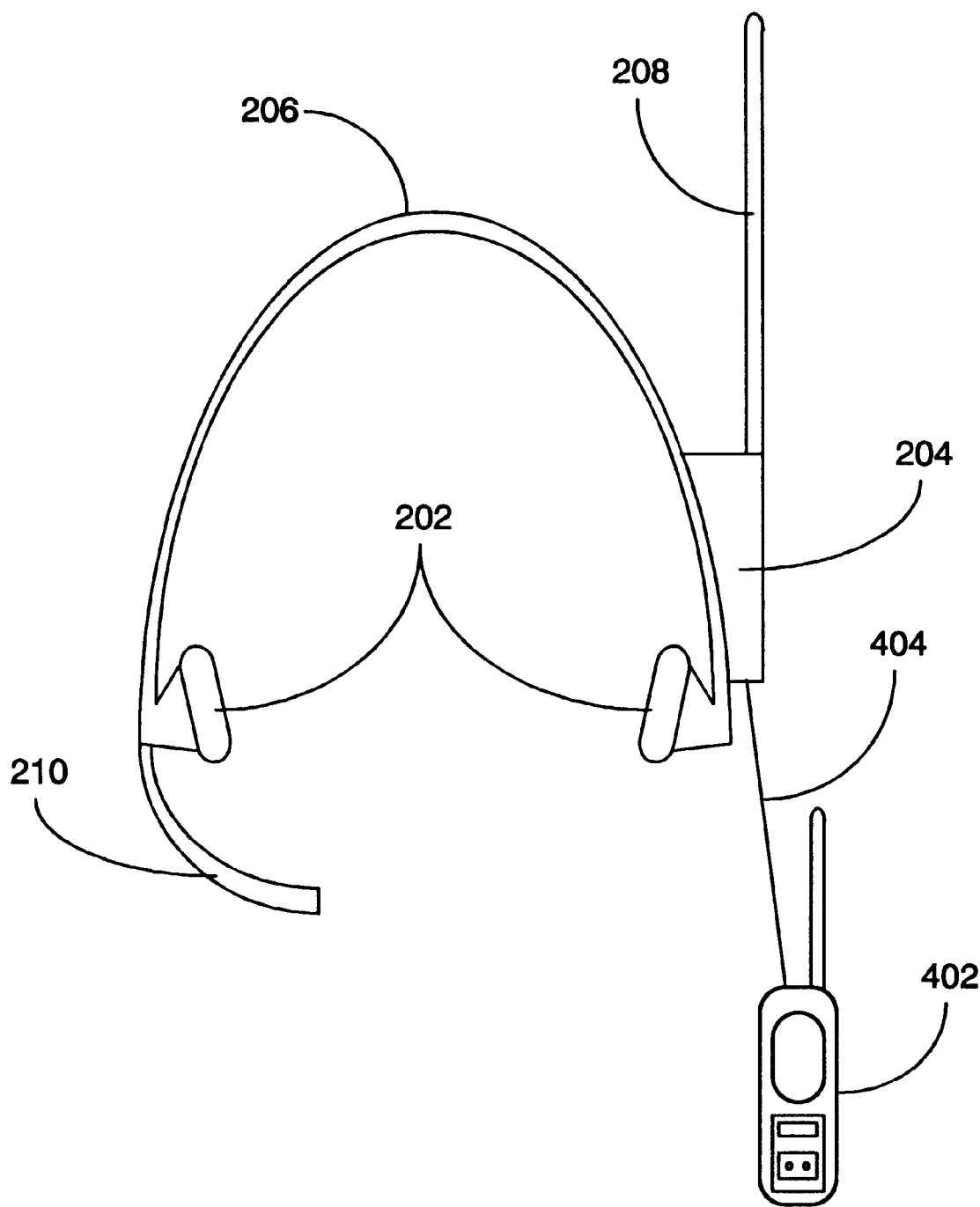
FIG. 4 is another alternative preferred embodiment in which the passive communications device is integrated into the headset and a conventional cellular phone is attached to an I/O port in the headset. An optional boom microphone is shown as an integrated part of the headset.

In FIG. 4, another preferred embodiment of IPAC 100 is illustrated. This embodiment allows a user who already owns a pre-existing device, such as a cellular telephone, to have the advantages of hands free operation without incurring the expense of purchasing a second (and redundant) cellular function. The existing passive communications device 102 is connected to a conventional cellular telephone 402 via attachment cable 404. Switching device 106 controls bi-directional passthru of audio data between the shared I/O and the cellular telephone. The cellular telephone 402 can be conveniently placed in the user's pocket providing the user with the convenience of hands free telephone operation.

Figure 5:
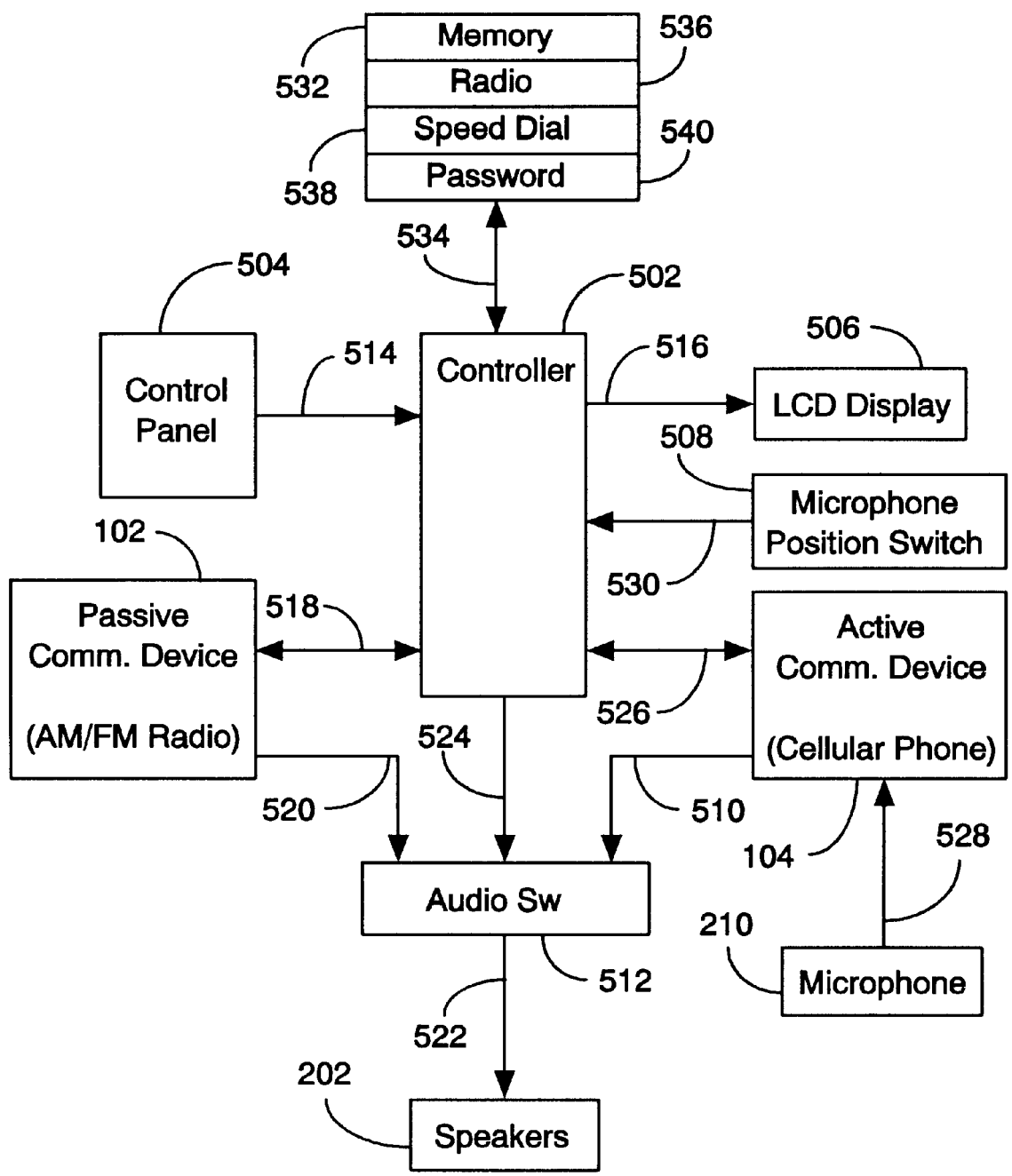
FIG. 5 is a block diagram of the system components.

FIG. 5 shows a block diagram of a preferred embodiment of the IPAC 100. The controller 502 is a low power microcomputer. An example of a suitable controller would be the Intel 80C5x series. It receives commands and information from the operator control panel 504 via bus 514. The control panel 504 has controls for such things as AM/FM radio frequency, phone numbers, volume control, etc. The LCD display 506 is used by the controller 502 via bus 516 to display status information such as current radio frequency, telephone number, signal strength, battery status, and so on.

Audio output is controlled as follows. A passive communications device 102 such as an AM/FM radio module is connected to the controller 502 via bus 518. This bus 518 is used by controller 502 to control functions in the radio module such as radio frequency, volume, etc. The audio output of the passive communications device 102 is input to an audio switch 512 via bus 520. The output of the audio switch 512 is connected to speakers 202 via bus 522. In the preferred embodiment, when the active communications device 104 is in the inactive state, and the passive communications device 102 is in the active state:

1. Controller 502 receives a passive communications device activation signal from control panel 504. In addition, it receives station selection and volume control information from control panel 504.

2. Controller 502 deactivates active communication device 104 via bus 526 and activates passive communication device 102 via bus 518.

3. Controller 502 displays station selection and volume control information on LCD display 506 for the user's reference.

4. Controller 502 inputs the station selection and volume information to passive communications device 102 via bus 518.

5. Audio data from passive communication device 102 is input to audio switch 512 via bus 520.

6. Controller 502 gates audio data from passive communication device 102 to speakers 202 via a control signal on bus 524 and degates audio data from active communication device 104 to speakers 202 via a control signal on bus 524.

When an active communications device 104, such as a cellular telephone, is used, it is connected to the controller 502 via a control bus 526. This bus is used to control operations of the cellular phone such as entering a phone number, etc. It is also used to transfer status information such as signal strength to controller 502. The active communications device's 104 audio output is also connected to the audio switch 512 via bus 510. In the preferred embodiment, when the passive communications device 102 is in the inactive state, and the active communications device 104 is in the active state:

1. Controller 502 receives an active communications device activation signal. This signal can be generated by the user by entering data in the control panel 504, it can be generated automatically by the active communications device 104 (in the case of in incoming telephone call), or generated automatically by an off hook condition when a telephone call is initiated. One method of creating an off hook condition is to detect when the microphone position switch 508 is activated which indicates the start of a telephone call.

2. Controller 502 deactivates passive communication device 102 via bus 518 and activates active communication device 104 via bus 526.

3. Controller 502 displays telephone call information on LCD display 506 for the user's reference. For example, the number being called, time of the call, etc.

4. Audio data from active communication device 104 is input to audio switch 512 via bus 510.

5. Controller 502 gates audio data from active communication device 102 to speakers 202 via a control signal on bus 524 and degates audio data from passive communication device 102 to speakers 202 via a control signal on bus 524.

Controller 502 and audio switch 512, in combination, comprise the function discussed as switch device 106 in FIG. 1. As can be seen, controller 502 selects which device is connected to the speakers 202. Likewise, controller 502 controls whether control panel 504 and LCD display 506 are used with active communications device 104 or passive communications device 102.

A microphone 210 is connected to the active communications device 104 (a cellular phone) via cable 528. The microphone 210 is used for cellular or walkie-talkie communications. The microphone 210 is also mechanically connected to microphone position switch 508. The microphone position switch 508 signals the controller 502 of its current position either "in use" (i.e., off hook) or "stowed". This position information is used by the controller 502 to automatically select the proper device to use. If the microphone 210 is "stowed", the passive communications device 102 is selected. If microphone 210 is "in use", the active communications device 104 is selected.

Also shown in FIG. 5 is optional memory 532 which is connected to controller 502 via bus 534. In the preferred embodiment, memory 532 is also shared between the various subsystems of IPAC 100. For example, preselected radio station frequencies 536 for use by the passive communications device 102 can be stored in one portion of memory 532 while speed dial numbers 538 for use by a cellular telephone in the active communications device 104 can be stored in another portion of memory 532.

Another use for memory 532 is to store an encrypted password 540 for use by a cellular telephone. In order to decrypt the password and activate the cellular telephone in active communications device 104, a user would have to enter a decryption password via control panel 504. The password would be used to decrypt the encrypted password 540 which would unlock the cellular phone. The advantage of an encrypted password 540 is that if the IPAC 100 was stolen, the cellular phone would be inoperable because the encrypted password 540 could not be decrypted by the thief.

An advantage of memory 532 is that it can store any data used by any of the various alternative embodiments under control of controller 502. As a practical matter the storage areas used above for preselected radio station frequencies 536, speed dial numbers 538, and encrypted password 540 can in fact be dynamically allocated portions of memory 532. As a result, the memory used by the device is a shared I/O device.

Figure 6:
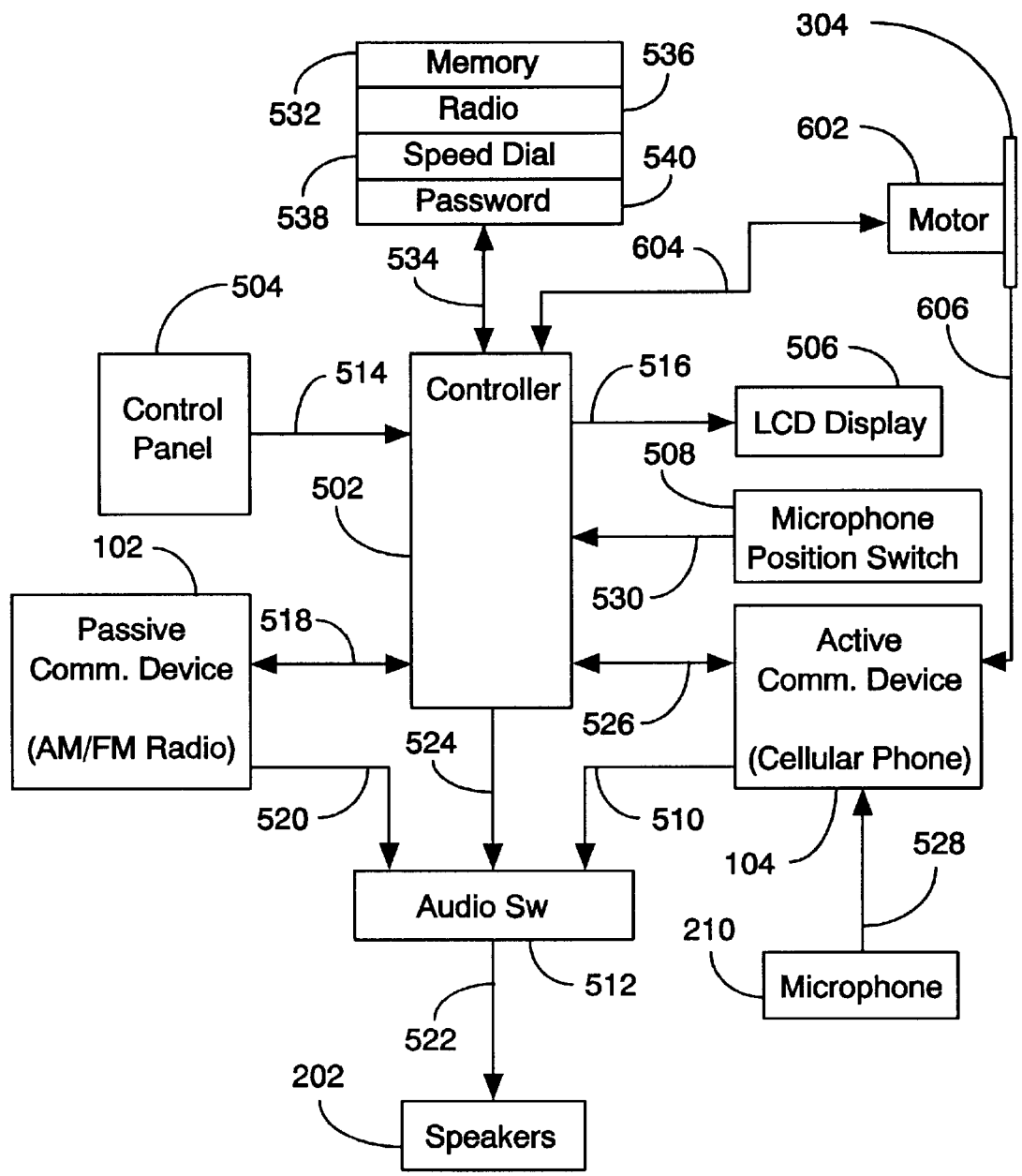
FIG. 6 is a block diagram of an alternative embodiment in which the telephone antenna is elevated and retracted under motor control.

FIG. 6 shows an alternative embodiment in which the antenna 304 used by the active communications device 104 is automatically extended or retracted by motor 602 under control of controller 502 via bus 604. Active communications devices 104 such as cellular telephones often have a retractable antenna. When antenna 304 is down, a cellular telephone can normally receive incoming calls. To improve communication quality, the antenna 304 must be raised. The controller 502 can determine when the phone is in use by receiving a "ring" signal via bus 526 or a microphone "in use" signal from microphone position switch 508 via bus 530. This data can be used to activate the antenna motor via bus 604 to either raise or lower the antenna 304 which is attached to active communications device 104 via antenna lead 606.

Figure 7:
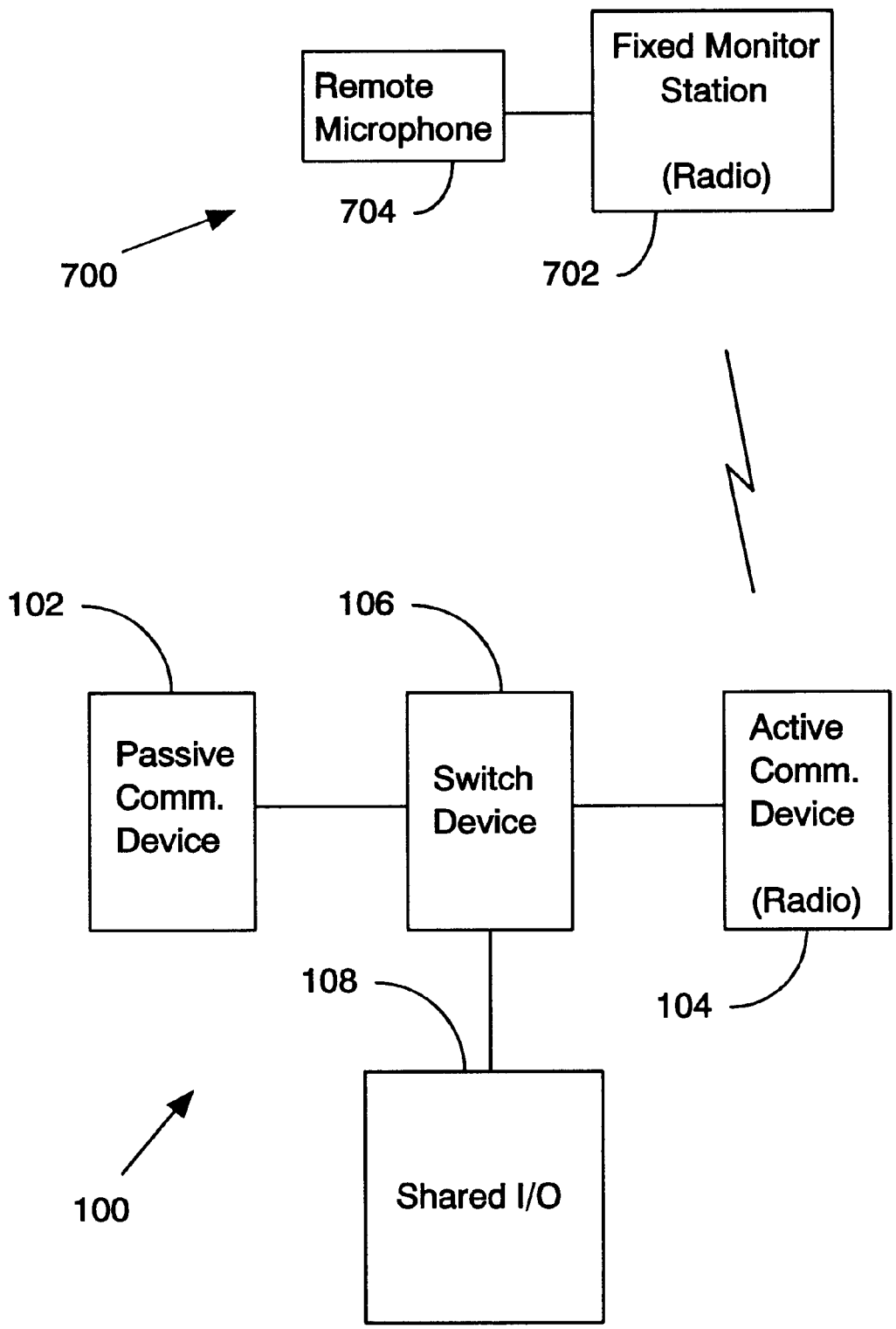
FIG. 7 is a block diagram illustrating an Integrated Passive and Active Communications system which is used with a fixed monitoring station.

FIG. 7 illustrates an alternative embodiment which uses a fixed monitoring station 700 in conjunction with IPAC 100. In this embodiment, active communications device 104 is a radio receiver. Remote microphone 704 provides input to the fixed monitor station transmitter 702. An advantage of this embodiment is that a parent can leave a small child or infant in a nursery (for example, when the child is napping) and still be able to monitor the child whether the parent was in another room of the dwelling or outside doing chores such as yard work. When the infant awakes or needs assistance, the parent would instantly be notified by transmission of the audio from the fixed monitor station transmitter 702.

The fixed monitor station transmitter 702 can have built in sensors which block signal transmission except when sound levels in the infants room exceed a predetermined level. For example, the sound level of a cough or spoken word of the child may be used to trigger transmission. Alternatively, the fixed monitor station transmitter 702 can constantly monitor the infant's room. The device could also be structured to allow the parent to select which of the foregoing monitoring techniques were used. Those skilled in the art will recognize that the control functions described herein could be implemented either in the fixed monitor station transmitter 702 or in the active communications device 104. Implementation of the control functions in the active communications device 104 allows the parent to change monitoring modes from a remote location.

Figure 8A:
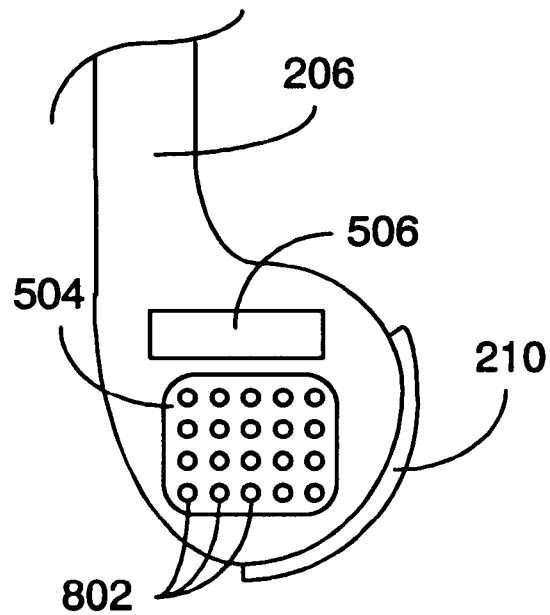
FIG. 8A is a side view of a preferred embodiment of the device illustrating the LCD display, the control panel, and the microphone in the "stowed" (on hook) position.

FIG. 8A is a side view of a preferred embodiment of the IPAC 100. This embodiment shows the LCD display 506 and the control panel 504 mounted on IPAC 100. Control panel buttons 802 can be used to dial a phone number, change radio frequencies, etc. In this figure microphone 210 is shown in the stowed (or on hook) position. In this position, the microphone 210 is conveniently rotated to rest against the forward edge of IPAC 100.

Figure 8B:
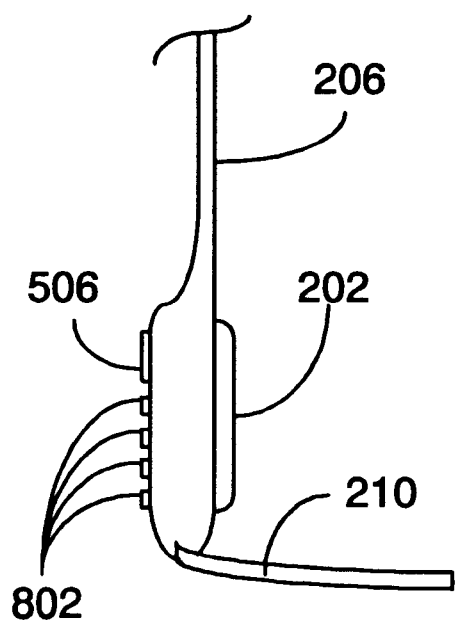
FIG. 8B is a front edge view of the device of FIG. 8A with the microphone in the "in use" (off hook) position.

FIG. 8B is a front edge view of IPAC 100 with microphone 210 rotated to the in-use (or off hook) condition. By attaching a switch (not shown) to microphone 210, the mere act of rotating microphone 210 to the off hook position can initiate a dial tone and begin a telephone call. The control panel buttons 802 can be used to dial a call in the conventional manner. In addition, control panel buttons 802 can be used as speed dial buttons for frequently called or emergency numbers.

An optional voice recognition function can also be used to initiate a call. Voice recognition dialing techniques are well known in the art. With this technique, a user merely has to flip microphone 210 into the in-use position and verbally give the commands necessary to call a particular number. This can be a significant advantage when the user is engaging in activities which make using the control panel buttons 802 inconvenient. As opposed to attempting to dial a number manually, it would be significantly faster and safer to use voice recognition or the speed dial buttons when bicycling.

Figure 9:
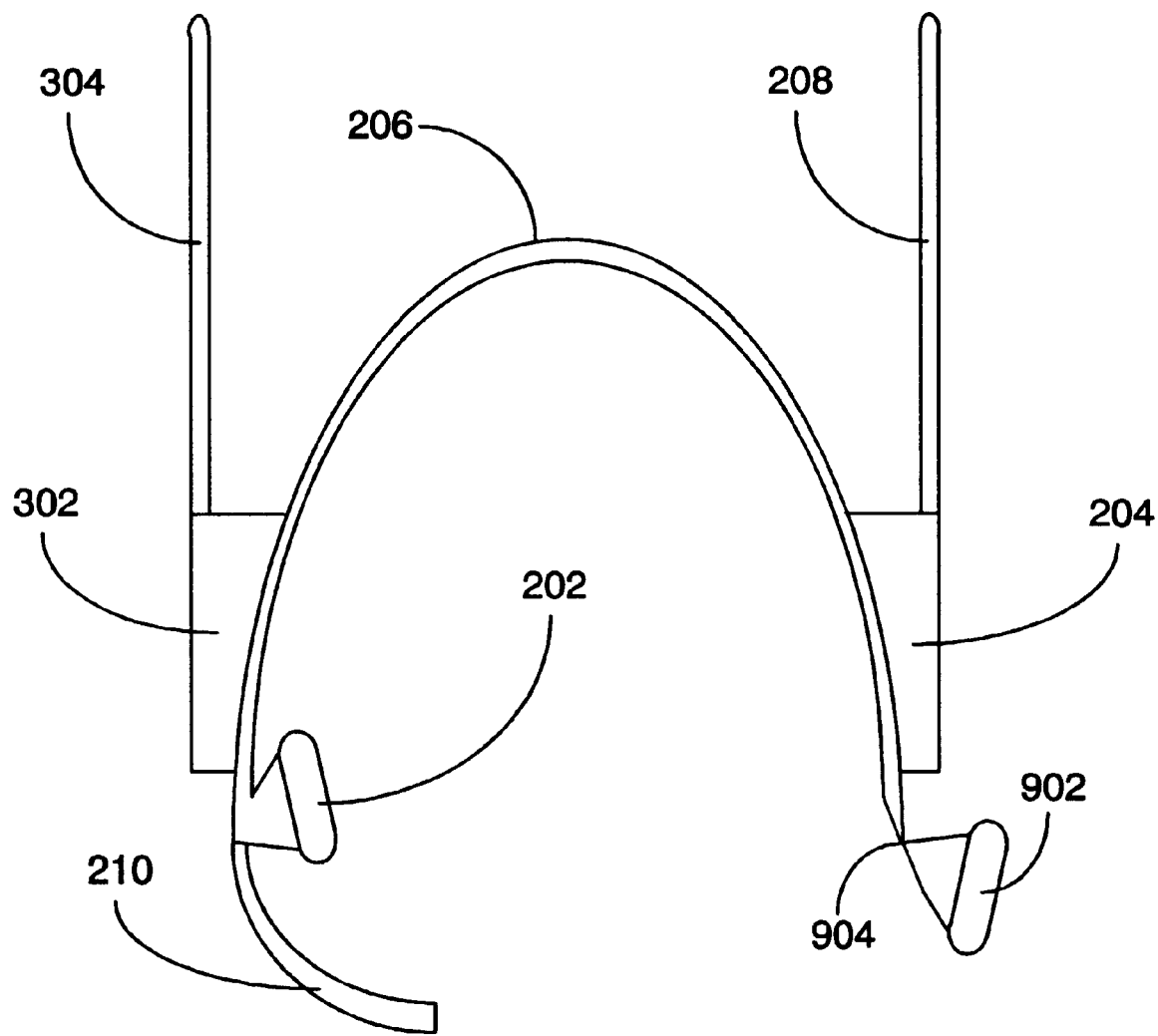
FIG. 9 illustrates an alternative embodiment in which one of the speakers can be opened such that it is positioned away from the users ear to allow safe telephone operation when operating a vehicle.

FIG. 9 is an alternative embodiment in which a hinged speaker 902 is attached to head strap 206 via a hinge 904. By hinging speaker 902, IPAC 100 can be more safely used when making a telephone call from a moving vehicle such as an automobile, because one ear is available to listen for traffic noises.

Figure 10:
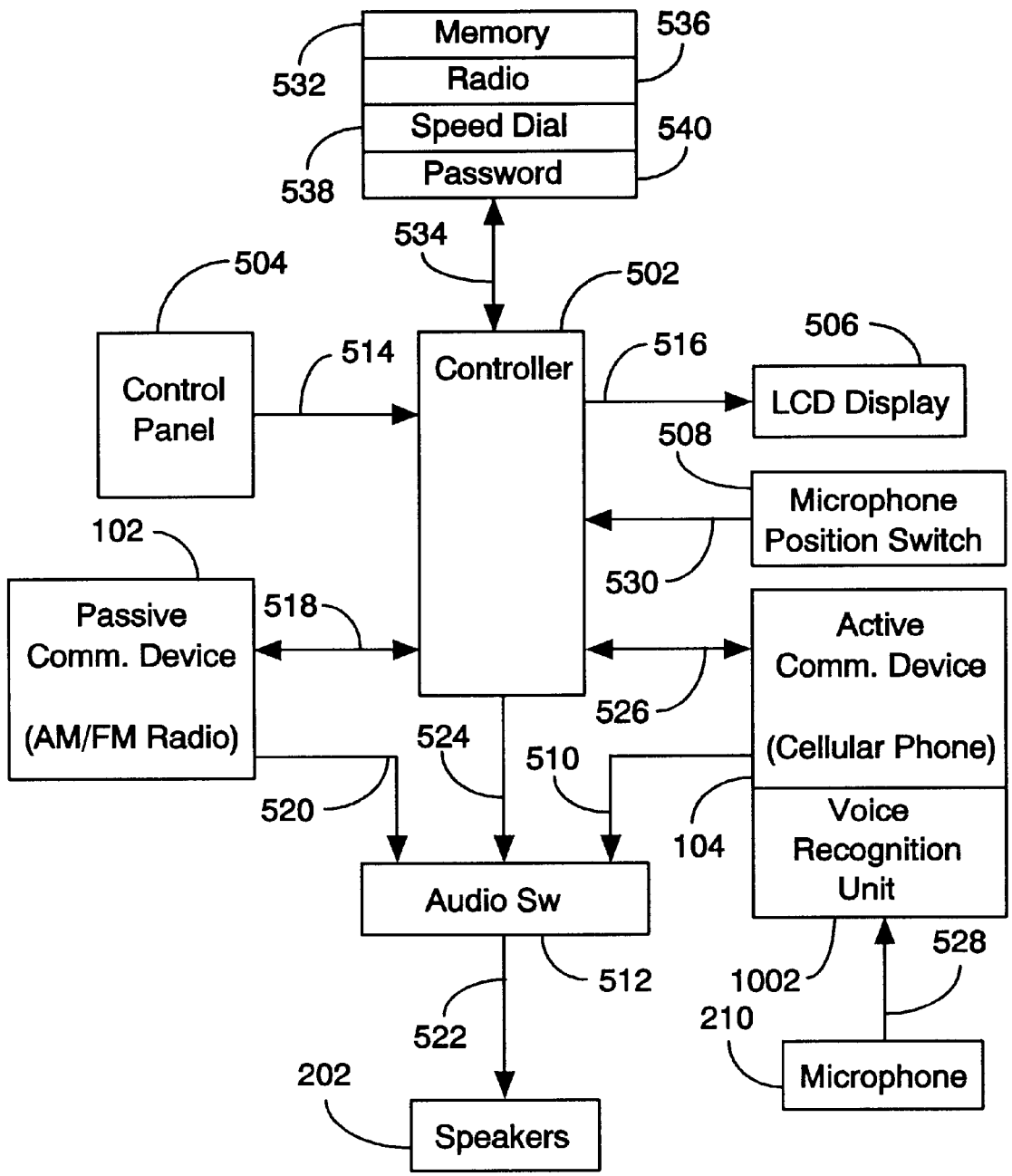
FIG. 10 is a block diagram illustrating an alternative embodiment with voice recognition circuitry in the Integrated Passive and Active Communications system.

FIG. 10 illustrates an alternative embodiment in which the active communications device 104 incorporates voice recognition circuitry 1002 (which can be hardware or software). When microphone 210 is moved to the off hook position, the voice recognition circuitry 1002 monitors the output of microphone 210 for verbal commands which are used to initiate a phone call. Verbal commands used to initiate telephone calls are well known in the art.

It is also possible to use voice data to control the passive communications device 102. For example, a button 802 can be used to activate voice data input when the telephone is on-hook. Likewise, when the microphone 210 is moved to the off-hook position, a voice command can be used to hang up the telephone and return control to the passive communications device 102. This can be advantageous when the user is engaging in activities, such as bicycling, which restrict use of their hands. A result of using voice control for manipulating the station frequency and volume controls of the passive communications device 102 is that the user can conveniently modify radio settings in a hands free manner.

Those skilled in the art will recognize that IPAC 100 can be further reduced in size and cost by locating the voice recognition unit 1002 in the remote cellular site.

Figure 11:
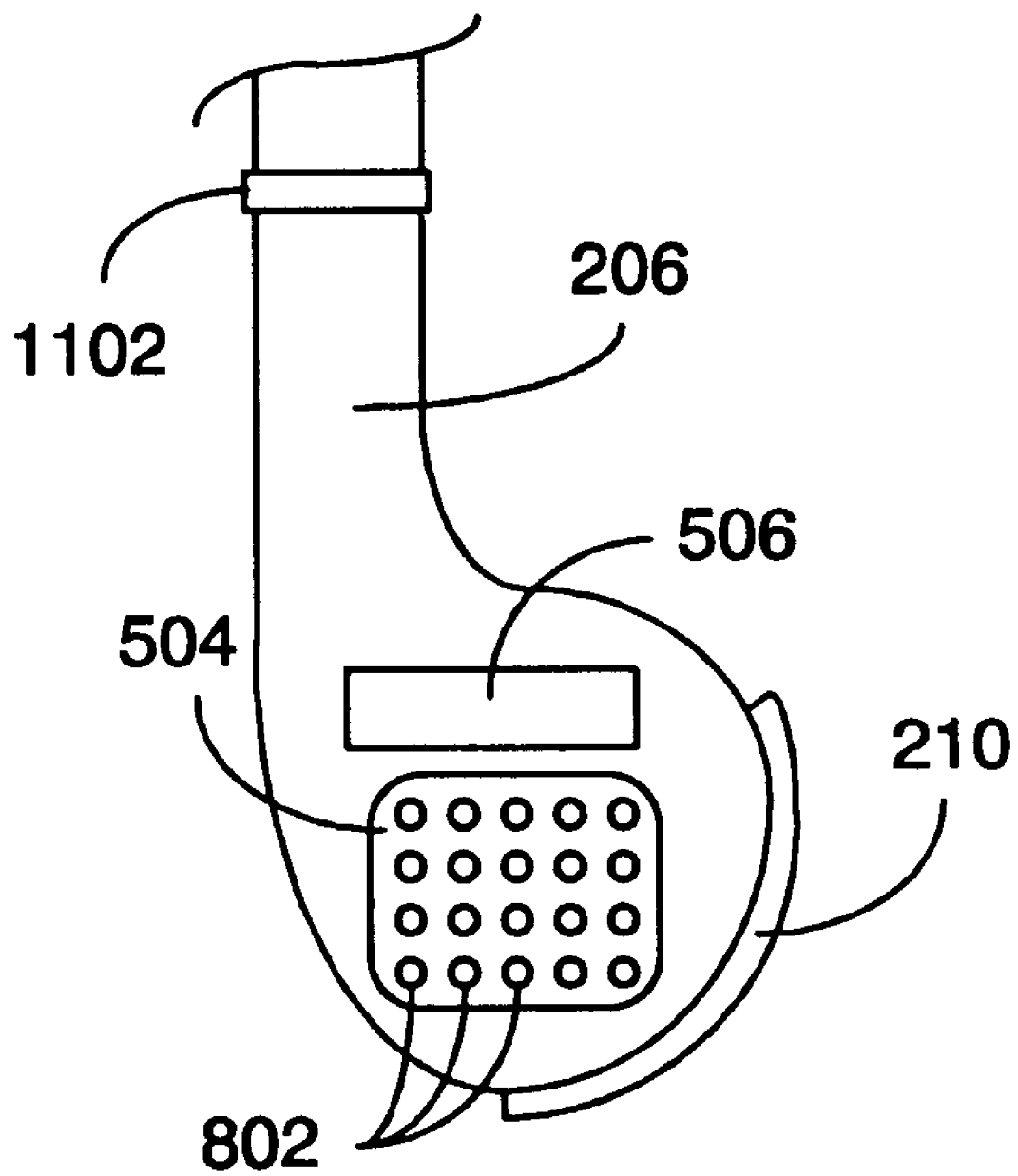
FIG. 11 illustrates an alternative embodiment with a folding head strap which uses hinges to fold the device for storage.

In FIG. 11, an alternative embodiment is shown which includes a folding head strap 206. This embodiment uses hinges 1102 to fold the device into a compact folded position for storage. Those skilled in the art will realize that a number of variations in design can be made to accommodate different folding techniques. For example, head strap 206 can be disconnected by removable couplings, multiple hinges can be used, the head strap 206 can swivel to bring each speaker together, etc.

Figure 12:
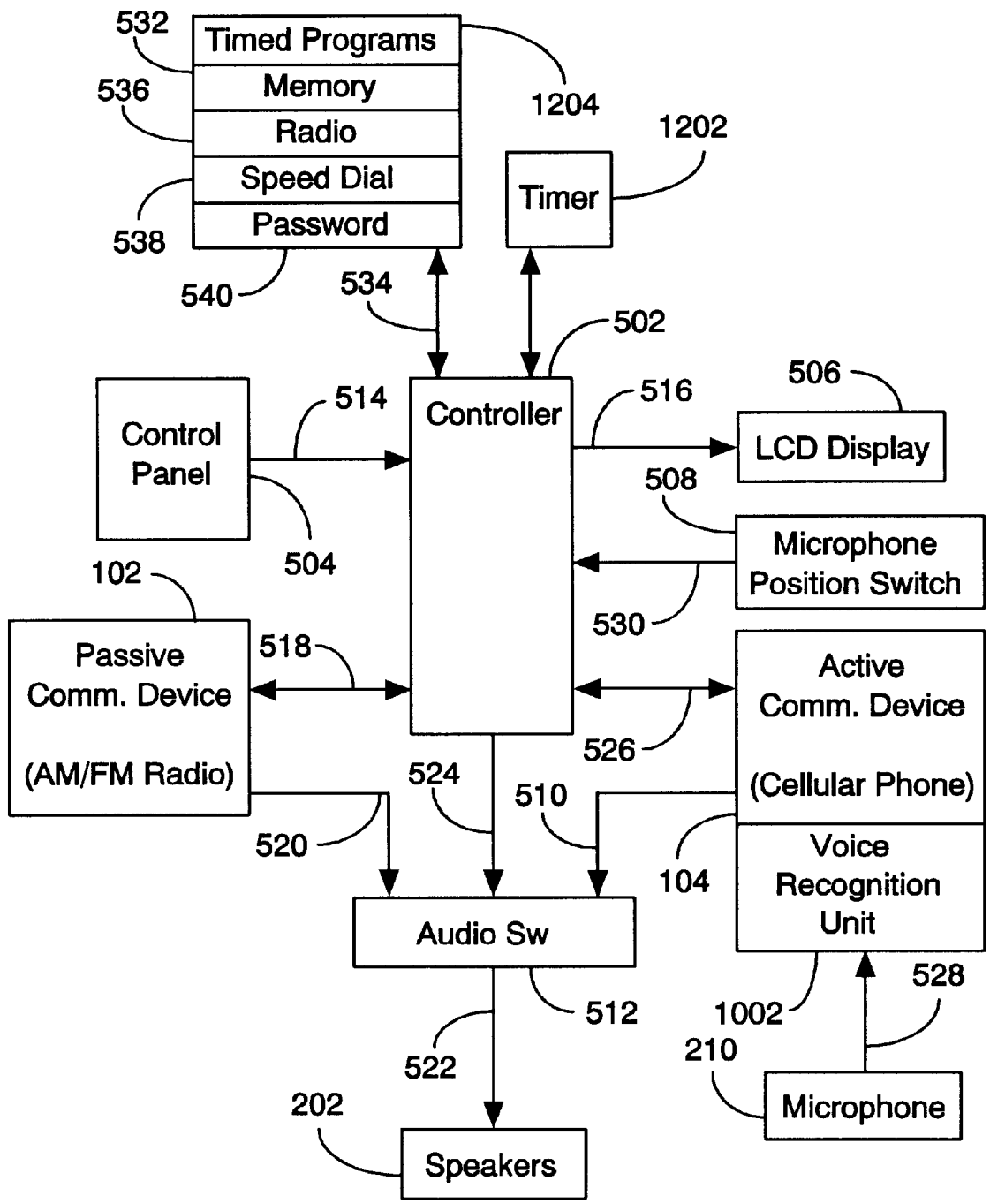
FIG. 12 illustrates an alternative embodiment which includes a programmable program timer and program memory that provides automatic program event control.

FIG. 12 illustrates an alternative embodiment which includes a programmable event function. Selected events can be programmed by controller 502 to automatically initiate using timer 1202 and timed programs memory 1204.

For example, the passive communications device 102 (i.e., a radio) can be controlled by storing a list of program times and station frequencies in timed program memory 1204. The timer 1202 is then set to automatically alert controller 502 when a program is about to begin. Controller 502 can then issue the appropriate control commands to passive communications device 102 via bus 518. In this manner, a user can program IPAC 100 to ensure that a desired program is not missed because the user forgets to turn on the radio at the appropriate time.

In addition, timer 1202 and timed program memory 1204 can also be used in conjunction with the active communications device 104. If, for example, the user wished to periodically communicate with the fixed monitoring station 702, but at the same time have use of the passive communications device 102, the programmable event function can be used to periodically switch from the passive communications device 102 to the active communications device 104 on a periodic basis. If a user had an infant in a nursery, the user could switch to the fixed monitoring station 702 every few minutes to see if the infant was awake. After a predetermined amount of time, the programmable event function would then automatically switch back to the passive communications device 102.

The programmable event function can also be used to control automatic placement of telephone calls at predetermined times. This allows a user to preprogram the telephone to avoid missing planned calls.

Figure 13:
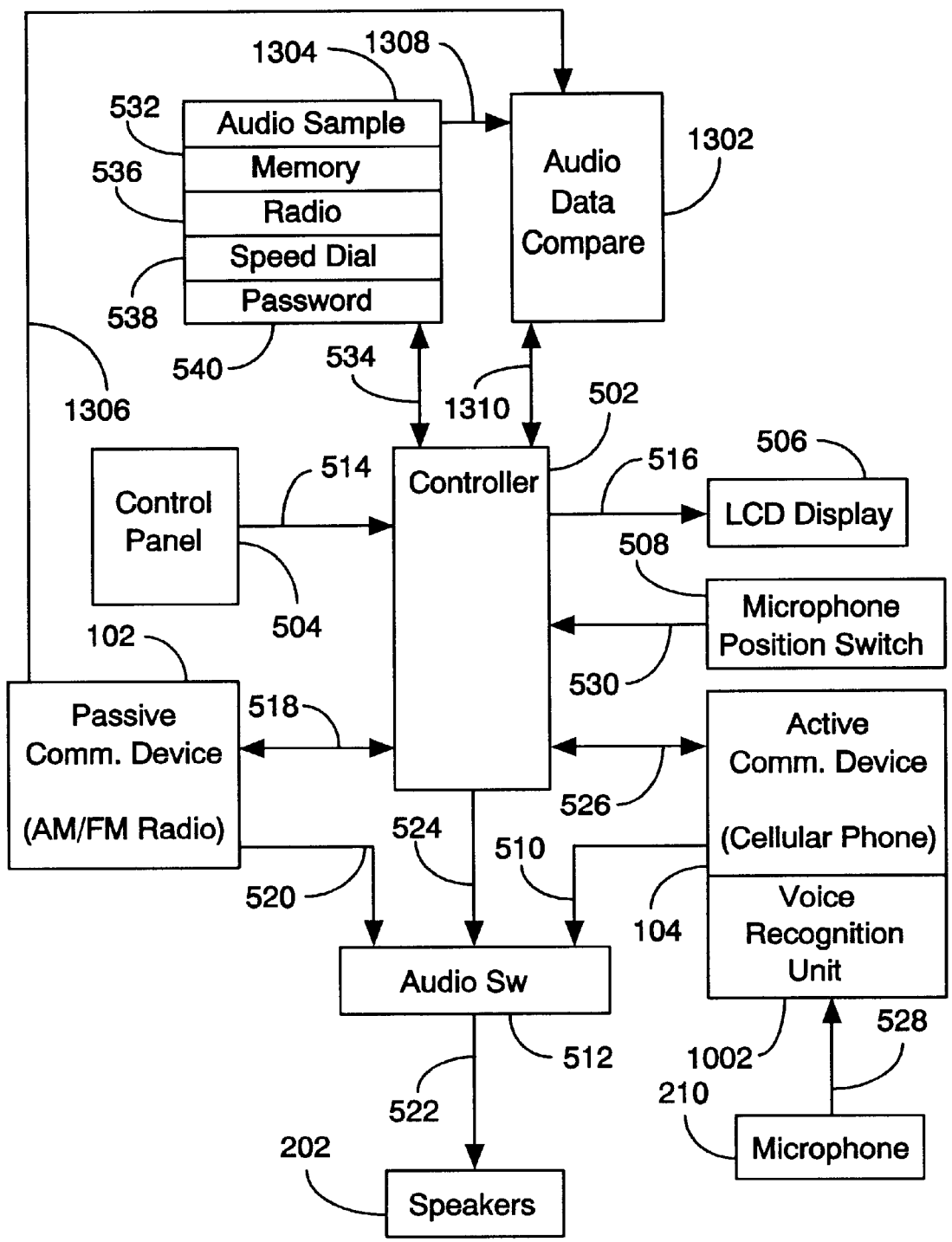
FIG. 13 illustrates an alternative embodiment which includes a selection search feature.

In FIG. 13, an optional selection search feature is illustrated. This feature is used to scan radio stations with the passive communications device 102 to search for a particular musical selection. When the selection is found, the controller 502 tunes the radio to the station playing the selection and activates the audio switch 512 to pass the selected musical work to the speakers 202. To accomplish this, a small segment of the musical work is stored in digital form in audio sample memory 1304. Audio samples from the passive communication device 102 are input via bus 1306 into an audio data compare function 1302 (which may be hardware or software) under control of controller 502. The stored sample in audio sample memory 1304 is input to audio data compare function 1302 via bus 1308. Bus 1310 is used by controller 502 to communicate with audio data compare function 1302. When the selected musical work is detected, controller 502 activates passive communications device 102 and selects the station which is playing the desired musical work.

Those skilled in the art will recognize that the least expensive method of searching would be to mute speakers 202 while the scanning process is performed. Of course, if additional circuitry were added, one station could be playing the output of a first tuner on speakers 202 while a second tuner could be used to scan the radio frequency band. The use of dual tuners would allow the radio to be used during the scanning process. Of course, searches for a number of musical works could be simultaneously performed via time slicing. However, each additional musical work would require additional storage space.

Figure 14:
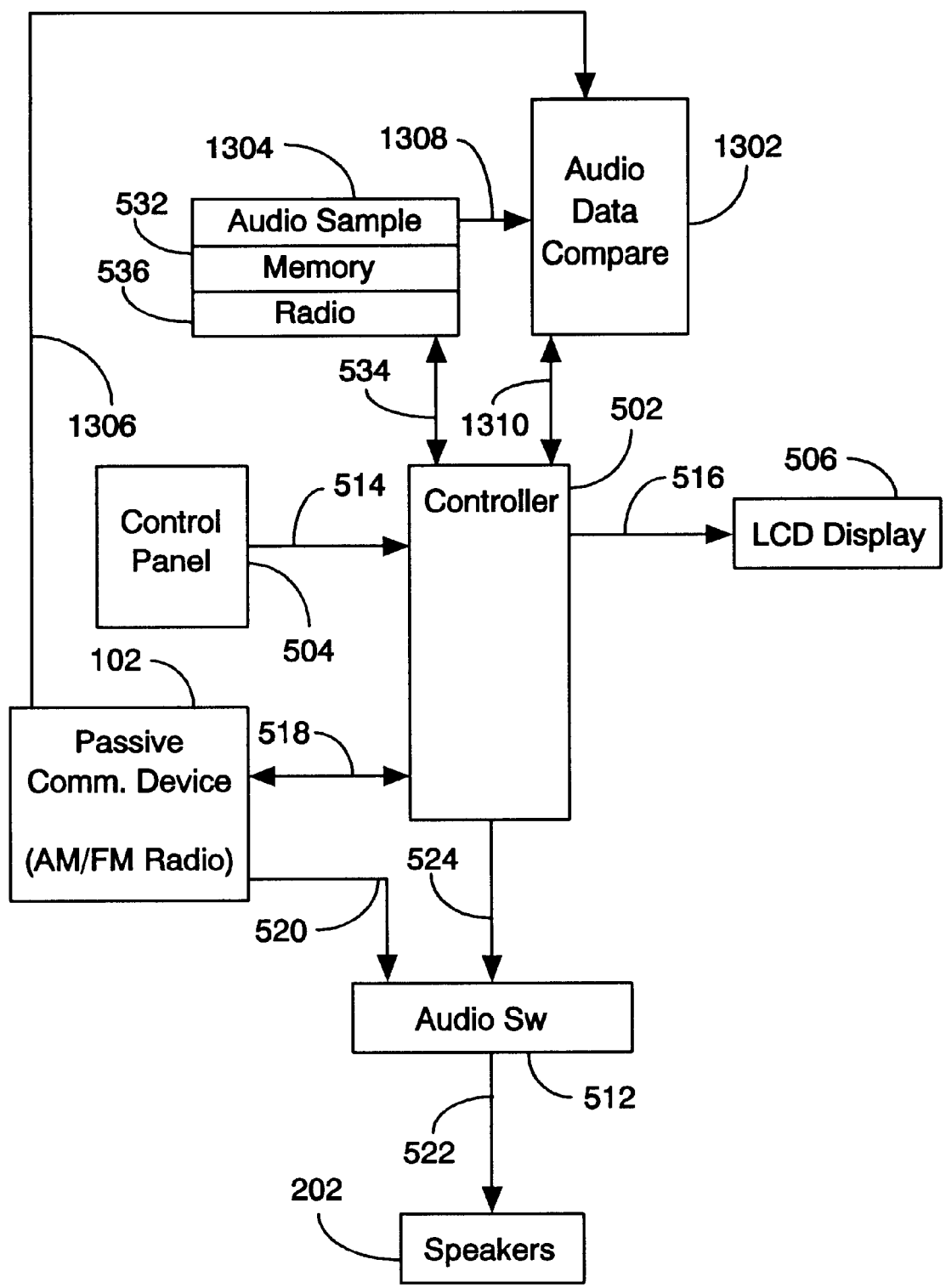
FIG. 14 illustrates an alternative embodiment which includes a passive-only communications system with a selection search feature.

In FIG. 14, a passive only embodiment of IPAC 100 is illustrated which uses the selection search feature discussed above in regard to FIG. 13. This embodiment illustrates the implementation of the selection search feature in a fixed location passive communications system 102 such as a tabletop stereo, or a moving location such as an automobile. If the passive communications system 102 is fixed, then of course there are no weight or size limitations. As a result, the amount of memory and number of simultaneous comparisons can be significantly increased over what would be practical for a portable IPAC 100.

Figure 15:
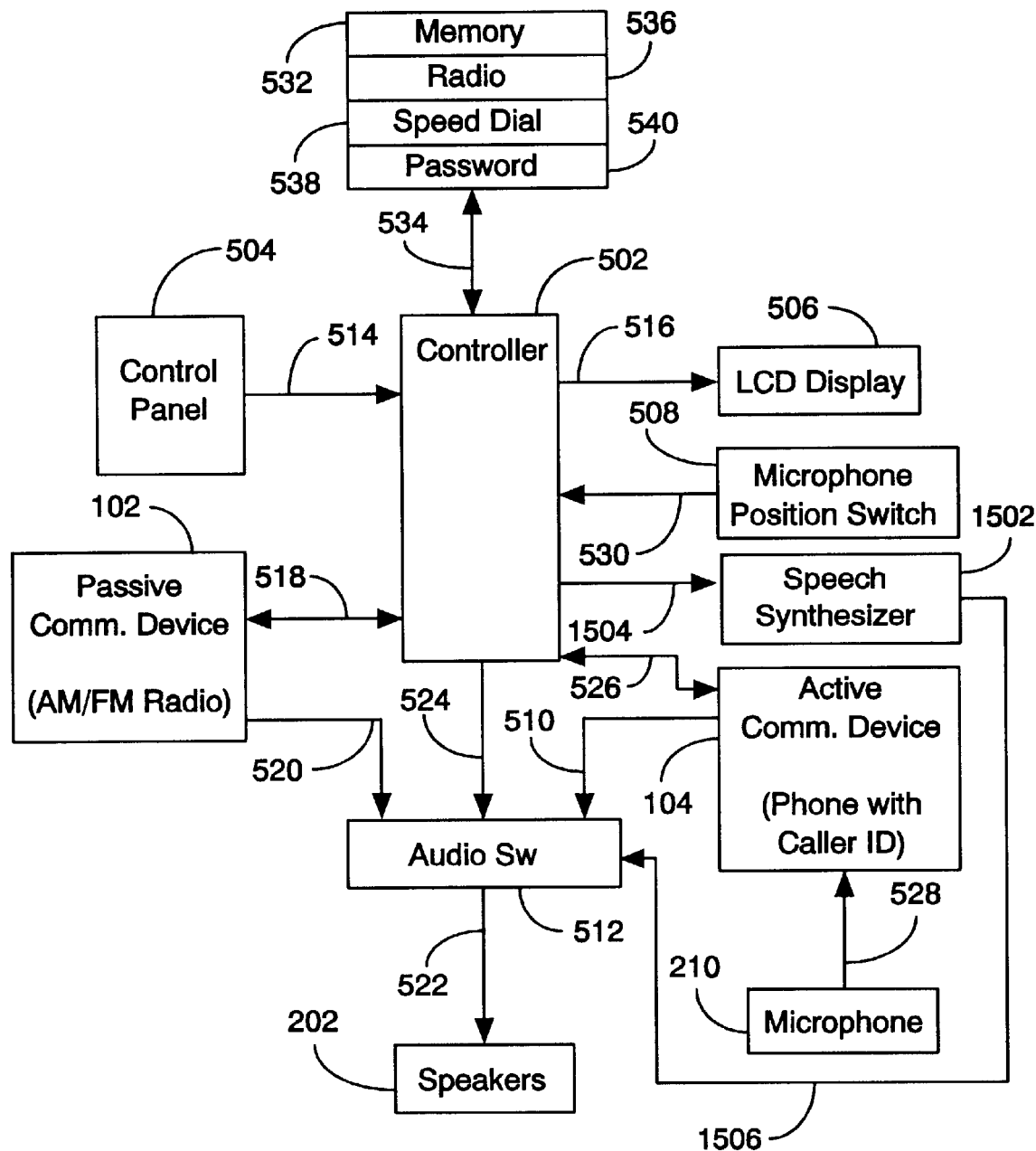
FIG. 15 illustrates an alternative embodiment which notifies the user as to who is calling via a caller ID function combined with a voice synthesizer.

FIG. 15 is an alternative embodiment in which the active communications device 104 is a telephone equipped with a caller ID function capable of identifying the source telephone number and/or the name of the person calling. Caller ID is a well known art in the field of telephonic communications. When a telephone call is received, controller 502 obtains the caller ID information from active communications device 104 via bus 526. Controller 502 then generates the audible name of the calling party via bus 1504 and speech synthesizer 1502. Speech synthesizer 1502 outputs audio data to audio switch 512 via output line 1506. In this manner, the user knows who is calling before answering the telephone call. Of course, for the user to have the ability to selectively answer the telephone, automatic answering must be disabled so that the user can manually answer the call or ignore the call based on the identity of the calling party.

Those skilled in the art will recognize that the functions described herein can be implemented in hardware or software. However, the preferred embodiment uses software implementation, where possible, because software provides a more inexpensive and easily modifiable method of implementing the many functions IPAC 100 is capable of performing. Likewise, the preferred embodiment envisions modular units which allow easier maintenance, convenient selection of desired features, and easy expandability. Modular units can be in the form of pluggable circuitry, PROM or EPROM units, etc.

While the invention has been described with respect to a preferred embodiment thereof, it will be understood by those skilled in the art that various changes in detail may be made therein without departing from the spirit, scope, and teaching of the invention. For example, the functions used by the device can be implemented in hardware, firmware, or software; functions can be outboarded to remote locations (such as was taught above in regard to voice recognition, the size and shape of the IPAC can vary to suit functional capacity, advantages created by new technology, etc.; functions can be fixed or modular in nature; existing communications technology can be replaced by new or future technological advantages, such as 900 MHz telephones replacing cordless, etc. Likewise, the size of the IPAC may vary based on improvements in electronic packaging technology, etc. Accordingly, the invention herein disclosed is to be limited only as specified in the following claims.

We claim:

1. A hands-free integrated passive and active communications system (IPAC), comprising:
    at least one shared I/O device;
    a passive communications device;
    an active communications device which is a telephone, further comprising:
        at least one audio input device; and
        means to communicate with a remote location; and
    a switch device, further comprising:
        a controller, the controller having means to control access to the shared I/O device, having means to control the passive communications device, and means to control the active communications device;
        gating means to control access to the shared I/O by the passive communications device and the active communications device; and
        means to automatically deactivate the passive communications device when the active communications device detects an incoming communication, and automatically activate the active communication device;
    a head set having a head strap which supports the audio input device the shared I/O device, the passive communications device, the active communications device, and the switch device;
    the shared I/O device is a first speaker and a second speaker, at least one speaker for each user's ear;
    a flexible headset strap, the flexible headset strap connected to a first speaker at one end and connected to a second speaker at the other end; and
    at least one of the speakers is attached to the flexible headset strap by a hinge, the hinge having a closed position in which the speaker is adjacent to user's ear and an open position in which the speaker is hingedly moved away from the user's ear such that at least one ear can hear ambient noise when the other speaker is used for a telephone call;
    whereby the IPAC controls active communications and passive communications with a reduced set of shared I/O devices, and automatically interrupts the passive communications device when an incoming transmission is received for the active communications device and whereby a user can place a telephone call while maintaining the ability to hear sounds not coming from the telephone.

2. An IPAC, as in claim 1, wherein the passive communications device is a radio receiver.

3. An IPAC, as in claim 2, wherein voice commands are used to control the radio receiver.

4. An IPAC, as in claim 1, wherein the active communications device is a walkie-talkie device.

5. An IPAC, as in claim 1, wherein the passive communications device is a CD player.

6. An IPAC, as in claim 1, wherein the active communications device is a cellular telephone.

7. An IPAC, as in claim 1, wherein the active communications device is a 900 mhz telephone.

8. An IPAC, as in claim 1, wherein the active communications device is a cordless telephone with a base station.

9. An IPAC, as in claim 1, wherein the active communications device uses voice activation to place telephone calls.

10. An IPAC, as in claim 9, wherein:
    a head set having a head strap which supports the audio input device, the shared I/O device, the passive communications device, the active communications device, and the switch device;
    the audio input device is a microphone, the microphone is movably attached to the headset such that it has an off-hook and an on-hook position;
    means to detect when the microphone moves from the on-hook to the off-hook position;
    means to activate the telephone when the microphone moves from the on-hook to the off-hook position.

11. An IPAC, as in claim 1, further comprising memory for storing preselected data.

12. An IPAC, as in claim 11, wherein at least a portion of the memory stores speed dial data.

13. An IPAC, as in claim 11, wherein at least a portion of the memory stores radio frequency data.

14. An IPAC, as in claim 11, further comprising:
    at least a portion of the memory stores encrypted telephone password data;
    a control panel for inputting decryption password data;
    means to use the decryption password data to decrypt the encrypted telephone password data;
    whereby access to the telephone requires entry of password data.

15. An IPAC, as in claim 1, further comprising:
    a speech synthesizer;
    a caller ID function to identify the source of a telephone call received by the active communications device;
    the controller having means to obtain caller ID identifying information from the active communications device and to control the output of the speech synthesizer such that audio information identifying the source of a call is output from the speech synthesizer to the audio switch and then gated to the speakers.

16. An IPAC, as in claim 6, further comprising:
    a microphone having a voice output;
    a voice recognition device having an input connected to the voice output of the microphone, the voice recognition device capable of recognizing voice commands, and further capable of outputting control commands to control operation of the passive communications device based on the content of the voice commands;
    whereby the passive communications device functions are controlled by voice commands.

17. A system, as in claim 16, wherein the passive audio device is a radio receiver.

18. A system, as in claim 16, wherein the passive audio device is a CD player.

19. An integrated passive and active communications system (IPAC), comprising:
    at least one shared I/O device;
    a passive communications device;

an active communications device, the active communications device being a telephone device which further comprises:
  at least one audio input device; and
  means to communicate with a remote location;
a switch device, further comprising:
  a controller, the controller having means to control access to the shared I/O device, having means to control the passive communications device, and means to control the active communications device;
  gating means to control access to the shared I/O by the passive communications device and the active communications device; and
  means to automatically deactivate the passive communications device when the active communications device detects an incoming communication, and automatically activate the active communication device;
a timed programs memory, having means to store programmed events;
a timer, the timer providing timing information for use by the controller; and
the controller having means to use the timing information in conjunction with the programmed events stored in the timed programs memory to control activation and tuning of the passive communications device when a preselected program is remotely broadcast and activation of the active communications device when a outgoing communication is to be made at a preselected time;
whereby the IPAC controls active communications and passive communications with a reduced set of shared I/O devices, and automatically interrupts the passive communications device when an incoming transmission is received for the active communications device.

20. An integrated passive and active communications system (IPAC), comprising:
  at least one shared I/O device;
  a passive communications device;
  an active communications device, said active communications device comprising a telephone;
  a switch device, further comprising:
    a controller, the controller having means to control access to the shared I/O device, having means to control the passive communications device, and means to control the active communications device; and
    gating means to control access to the shared I/O by the passive communications device and the active communications device;
  an audio sample memory, having means to store samples of musical works;
  audio data comparison means, having a first input for inputting data from the audio sample memory, a second input for inputting data from the passive communications device, and an output which indicates whether the data from the audio sample memory and the data from the passive communications device match;
  the controller having means to monitor the audio data comparison means and means to activate transfer for data from the passive communications device to speakers 202 when the audio data comparison means indicates a match;
  whereby the IPAC is capable of active communications and passive communications with a reduced set of shared I/O devices.

21. A passive communications system, comprising:
  a radio receiver having at least one radio tuner having an audio data output;
  audio sample memory, for storing a preselected sample of audio data;
  audio data comparison means to compare the preselected sample of audio data with the audio data output of the radio tuner;
  means to switch the tuner frequency at preselected times, such that radio stations received by the radio receiver are scanned by the audio data comparison means;
  audio speaker means;
  a controller, the controller having means to select a radio station and activate the audio speaker means when the audio data comparison means indicates that the preselected sample of audio data and the audio data output of the radio tuner match; and
  whereby the radio receiver is automatically activated when a preselected audio work is detected on a particular radio station.

22. A passive communications system, as in claim 21, further comprising:
  at least two tuners, the first tuner providing an audio data output for input to the audio data comparison means, and the second tuner providing audio data for output by the receiver to the speaker means;
  means to switch the selected frequency of the second tuner to the frequency of the first tuner when the audio data comparison means indicates that a match has been detected;
  whereby the passive communications system can play audio works on one radio station while scanning other stations for a selected work, and then automatically switch to the radio station playing the selected work when the selected work is detected by the audio comparison means.

* * * * *